United States Patent [19]

Rohrer

[11] 4,395,859

[45] Aug. 2, 1983

[54] METHOD AND APPARATUS FOR SECURING AN OBJECT TO A SUPPORT STRUCTURE

[75] Inventor: Oscar J. Rohrer, Springfield, Ill.

[73] Assignee: State of Illinois, Department of Transportation, Springfield, Ill.

[21] Appl. No.: 156,777

[22] Filed: Jun. 5, 1980

[51] Int. Cl.³ .............................................. F16B 13/02
[52] U.S. Cl. ........................................ 52/705; 52/743; 405/260
[58] Field of Search ................. 52/705, 704, 698, 734, 52/736, 744, 743, 741, 127; 405/260, 261; 411/16, 17, 411, 75

[56] References Cited

U.S. PATENT DOCUMENTS

| | | | |
|---|---|---|---|
| 617,492 | 1/1899 | Love | 52/705 |
| 806,407 | 12/1905 | Farrington | 411/17 |
| 1,227,627 | 5/1917 | Kennedy | 52/705 |
| 1,311,646 | 7/1919 | Gordon | 52/705 |
| 2,351,449 | 6/1944 | Noble | 405/260 |
| 2,667,037 | 1/1954 | Thomas | 405/260 |
| 3,311,012 | 3/1967 | Williams | 405/260 |
| 4,205,587 | 6/1980 | Van Der Lugt | 411/16 |
| 4,252,474 | 2/1981 | Botes | 405/260 |

FOREIGN PATENT DOCUMENTS 536820 4/1965 Belgium .............................. 405/261
936082 11/1955 Fed. Rep. of Germany ...... 405/260

*Primary Examiner*—John E. Murtagh
*Attorney, Agent, or Firm*—Kirkland & Ellis

[57] ABSTRACT

The invention relates to a method and apparatus for securing an object to a support structure. The apparatus generally comprises a rod-shaped anchoring member provided with a longitudinal aperture therethrough. The anchoring member is externally threaded at a first end and at a second end is provided with a spiral groove adapted for receipt of a flexible wire. The anchoring member is also provided at the first end with a one-way valve.

In practicing the method of the present invention, the anchoring member is positioned in an anchoring hole, or void, existing in the support structure. A hardenable and cementitious material is injected through the one-way valve until the anchoring hole is substantially filled with the hardenable and cementitious material. Thereafter the assembly is allowed to remain undisturbed until the hardenable and cementitious material sets and hardens.

8 Claims, 5 Drawing Figures

U.S. Patent   Aug. 2, 1983   4,395,859
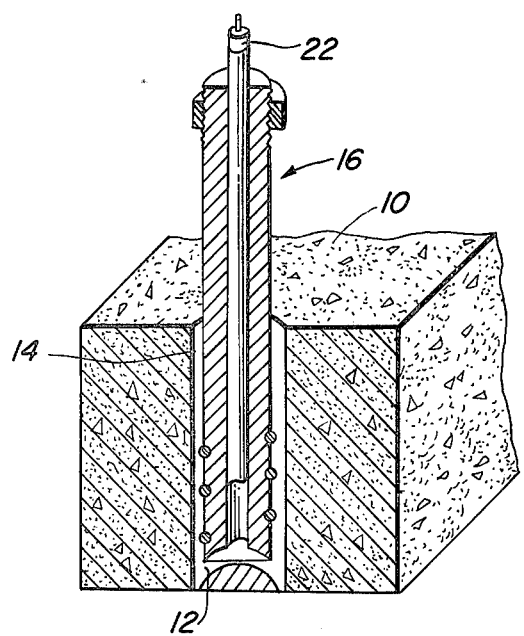
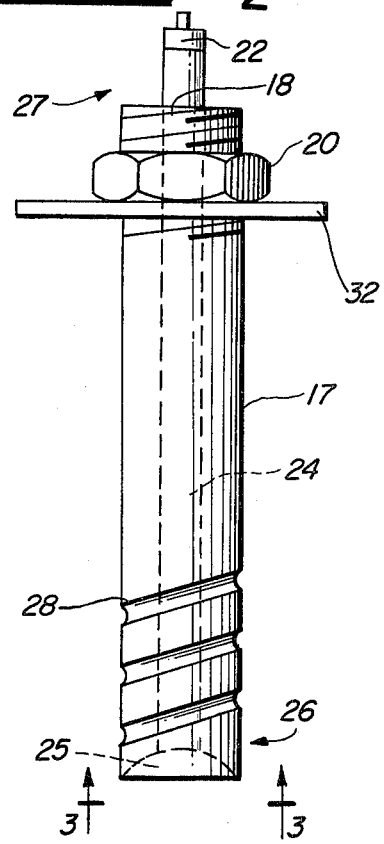
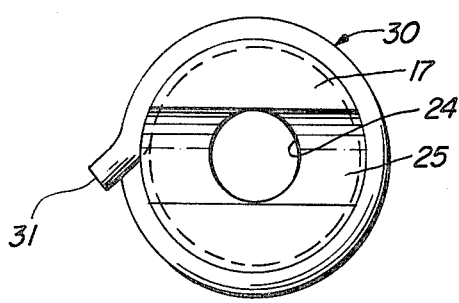
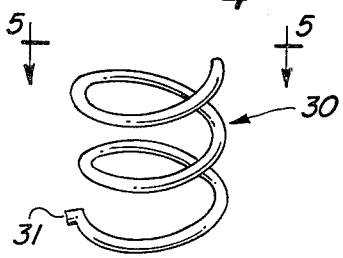
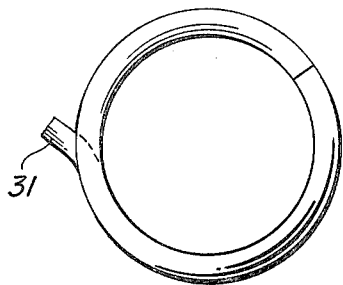

METHOD AND APPARATUS FOR SECURING AN OBJECT TO A SUPPORT STRUCTURE

BACKGROUND OF THE INVENTION

1. Field of the Invention

The present invention generally relates to a method and apparatus for securing objects to support structures and, more particularly, to a method and apparatus for imbedding an anchoring member in a body of hardenable cementing or other binder material.

2. Description of the Prior Art

One method of anchoring an object to a support structure having an anchoring hole may proceed by inserting therein a tubular anchoring member which has a closed leading end and an open trailing end. An internal thread is provided at the open trailing end for threadedly receiving a screw operative for securing the object to the anchoring member, and via the same, to the support structure.

The anchoring member may have transverse dimensions so as to be receivable in the anchoring hole with radial clearance therefrom. A ring-shaped cap member may surround the trailing end portion of the anchoring member in the assembled condition, and may have such dimension as to center the anchoring member in the anchoring hole and to sealingly close the open end of the clearance existing between the inner surface of the anchoring hole and the outer surface of the anchoring member. The anchoring member may also be provided with an internal passage and at least one aperature in communication with the passage through which a hardenable material may be introduced into the clearance existing in the anchoring hole.

The hardenable material may be forceably injected into the open trailing end of the anchoring member by an injection device. A guide sleeve, receivable in the interior passage may be connected to the injection device for guiding the hardenable material located in the injection device into the clearance.

The injection device which supplies the hardenable material may have a nozzle and a plug constructed as a one-way valve adapted to be received in the internal passage of the anchoring member immediately upstream of the aperature. Of course, the one-way valve permits flow of the hardenable material from the injection device through the nozzle and through the aperature into the clearance but prevents backflow of such hardenable material in the opposite direction.

This and other examples of the prior art method and apparatus for securing an anchoring member to a support structure may be found in the following U.S. Pat. Nos.: 4,120,128, issued to Pauls; 4,114,329, issued to Fischer, et al.; 4,063,582, issued to Fischer; 4,050,202, issued to Fischer, et al.; 4,044,512, issued to Fischer, et al.; 2,930,199, issued to Jarund; 2,210,441, issued to Bachman; 1,311,646, issued to Gordon; 617,492, issued to Love; and 556,082, issued to Boeddinghaus.

For example, the U.S. Pat. No. issued to Pauls (4,120,128) discloses an apparatus for securing a tubular anchoring member into an anchoring hole of a support structure. In particular, the anchoring member or dowel 1, containing an interior passage 40, is inserted into an anchoring hole 16 of a support structure. The outermost edge of the dowel 1, when viewed from the surface of the support structure, has a reduced diameter portion 4. An internal thread is provided on the reduced diameter portion 4 into which a screw is inserted to secure an object to the dowel 1 and thus to the support structure in which the anchoring hole 16 is provided. A ring-shaped capped member 6 is mounted on and surrounds the reduced diameter portion 4 and serves to close the end of the clearance existing between the outer surface of the dowel 1 and the inner surface of the support structure of the anchoring hole 16. The dowel 1 is sized such that when inserted into the anchoring hole 16, a circumferential space exists between the outer surface of the dowel 1 and the inner surface of the anchoring hole 16. In use, a sleeve 41 is inserted into the dowel 1. The sleeve 41 has attached at one end thereof a bag 47. The bag is subdivided into a plurality of compartments each containing a different component of a multi-component hardenable binder material. Thus, when it is desired to fill the anchoring hole 16 with the hardened material, the bag 47 is compressed, as by squeezing, to mix the multi-component binder together and to force the hardenable material contained therein through the sleeve 41 and outwardly through an aperture 22 of the dowel 1. After the hardenable material is injected into the anchoring hole 16, the sleeve 41 is removed from the dowel 1. Accordingly, upon hardening of the hardenable material, the dowel 1 is embedded in the anchoring hole 16. When it is desired to secure an object to the support structure, it is necessary to screw the object into the reduced diameter portion 4 of the dowel 1.

Fischer, (U.S. Pat. No. 4,063,582) discloses a method and apparatus for anchoring a mounting element in a hold of a support structure. The mounting element 4 is insertable into the hole 2 and has a cross-sectional dimension less than the cross-section of the hole 2 so that a circumferential recess is formed between the outer surface of the mounting element 4 and the hole 2. The mounting element 4 has a central bore 9 extending in a longitudinal axial direction and is adapted to receive a threaded element, such as a screw. The central bore 9 communicates with the circumferential recess by means of a transverse bore 12. In use, an adapter element 10 is inserted into the central bore 9 of the mounting element 4. The adapter element 10 has a blind hole consisting of a central hole and a transverse hole 11. The transverse hole 11 communicates with the central hole and is open at an outer surface of the adapter element 10. Thus, when a hardenable material is injected through the adapter element 10, it flows through transverse hole 11 and into the circumferential recess surrounding the mounting element 4. After completion of the injection step, the adapter element 10 is withdrawn from the mounting element 4 and a threaded element is inserted into the central bore 9.

Bachman (U.S. Pat. No. 2,210,441) discloses a socket adapted to be embedded in a floor, sidewalk, or other surface to receive therein the end of a pole or post. The socket comprises a base member 1 and a tubular portion 2 open at its outer or upper end and having a substantially closed inner or bottom end 3 which is provided with an internally threaded aperature 4. The base member 1 is adapted to be embedded within a floor or wall 5 with its upper end substantially flush with the surface of the floor or wall. When it is desired to install the socket, a hole of a diameter greater than the outside diameter of the base member 1 is made in the floor. The base member 1 is inserted within the hole, and cement, molten lead or other self-setting material 6 is poured into the space between the base member 1 and the walls defining the hole. In order to assist in securely locking the base member 1 in position, Bachman provides the outer surface of the tubular portion 2 with any convenient form of irregularities as for example, radially extending spikes 7, or spiral groove 8. Apertures 9 are also provided at convenient locations through the walls of the tubular portion 2 to function as vents during the pouring of the self-setting material 6. The socket also includes an inner member comprising a tubular portion 10 having a substantially closed inner or bottom end 11 provided with an aperture 12. The inner portion has an external diameter slightly less than the internal diameter of the base member 1 and is adapted to be slideably engaged within the base. The inner member may be vertically positioned with respect to the base member 1 by using a headed screw 19 which is passed through the aperture 12 and engaged within the threaded aperture 4 in the bottom end 3 of the base member 1.

Gordon (U.S. Pat. No. 1,311,646) describes a mounting bracket for receiving screws. The device is composed of a helix or spiral of wire a, the interior of which is adapted to engage the thread of the screw b. The helix is formed with a series of radial projections c which are located such that the helix a may be centrally positioned in a hole d which is adapted to receive helix a. In use, a screw is first screwed into the device, after which the device is inserted into for example, a blind hole drilled into a wall, floor, ceiling, or the like. Thereafter, cement, lead, or the like, is inserted around the device and is allowed to set. The device is thereby effectively installed, and the screw can be readily unscrewed therefrom when desired.

Boeddinghaus (U.S. Pat. No. 556,082) discloses a device similar to that described by Gordon. In Boeddinghaus, a spiral wire c is inserted into a hold bored into, for example, a wall. The spiral wire c is secured in place by plaster-of-paris, cement, or other binding material. Thereafter, a shank a' contained on, for example, screw or bolt a is screwed into the spiral c and is thus held firmly in place.

However, these prior art references are individually or jointly deficient in that none discloses anchoring member advantageously adapted for use in anchoring large objects to support structures. Accordingly, it is an object of the present invention to provide an apparatus and method adapted for securing heavy objects, such as signs, beams, and bridge structures, to a support structure, which may be, for example, a cement block, concrete abutment, pier, beam, or piling.

It is another object of the present invention to provide an anchoring member adapted for fitting engagement with the inner-surface of an anchoring hole which has been pre-formed in the support structure. Such fitting engagement readily permits accurate positioning of the anchoring member in the anchoring hole with the added advantage that once so positioned, the anchoring member will be temporarily locked in place.

It is yet a further object to provide an anchoring member which includes a longitudinal aperture therethrough and fitted at one end thereof with a one-way valve. Thus, according to the method of the present invention, after the anchoring member is locked in the anchoring hole, a hardenable and cementitious material may be injected through the one-way valve in order to fill the clearance existing between the outer surface of the anchoring member and the inner-surface of the anchoring hole.

The apparatus and method of the present invention advantageously permits the use of a water-insensitive hardenable and cementitious material thus providing secure attachment even in damp weather conditions.

SUMMARY OF THE INVENTION

The present invention provides an apparatus and method for securing an anchoring member to a support structure. The apparatus comprises a rod-shaped anchoring member provided with an aperture longitudinally therethrough. The anchoring member is externally threaded at one end and at the other end thereof is provided with a spiral groove adapted for receipt of a flexible wire member therewithin. The anchoring member is also provided with, at the externally threaded end, with a one-way valve. Advantageously, the flexible wire is provided, at the lowermost end thereof, with a lip extending generally transversely from the longitudinal axis of the anchoring member.

In practicing the method of the present invention, the anchoring member, including the flexible wire member, is positioned within a pre-formed hole (or void) existing in the support structure. The anchoring member is thereafter seated in the support structure, as by turning or screwing the anchoring member into the hole, until the lip on the flexible wire member engages the inner-surface of the hole and holds the anchoring member firm. Next, a hardenable and cementitious material is forceably injected through the one-way valve until the hardenable and cementitious material fills the clearance existing between the anchoring member and the walls of the hole in the support structure. Once injection is complete, the resulting assembly is allowed to remain in an undisturbed condition until the hardenable and cementitious material sets and hardens.

BRIEF DESCRIPTION OF THE DRAWING

FIG. 1 is a partial, three dimensional cross-section of a support structure containing a hole or void with the novel anchoring member of the present invention positioned therewithin;

FIG. 2 is a side view of the novel anchoring member of the present invention showing a helical groove at one end thereof for receipt of a wound wire;

FIG. 3 is a bottom view of the anchoring member of FIG. 2 showing a transverse groove and depicting the wound wire in the helical groove of the anchoring member;

FIG. 4 depicts a pre-formed helical-shaped flexible wire adapted for engagement with the anchoring member; and FIG. 5 is a top view of the wire of FIG. 4 showing a lip on the wire.

DETAILED DISCUSSION OF THE PREFERRED EMBODIMENT

Referring now to FIG. 1, an anchoring member 16 of the present invention is shown in conjunction with a section of a support structure 10. The support structure 10 may be, for example, a cement block, concrete abutment, pier, beam, or piling used as a base for the support of heavy objects such as, for example, signs, beams, and bridge structures. The anchoring member 16 is shown positioned within a substantially cylindrical hole 12 which, prior to the positioning of the anchoring member 16 therein, has been drilled or constructed in the support structure 10. The hole 12 is sized such that when the anchoring member 16 is placed therein, there exists a clearance 14 between the inner surface of the hole 12 and the outer surface of the anchoring member 16. For example, and without limitation, a clearance of from about 1/32 inch to about ¼ inch is acceptable for the present invention, with the preferred clearance being about 1/16 inch to about ⅛ inch.

Referring now to FIG. 2, the anchoring member 16 of the present invention is depicted in detail. The anchoring member 16 comprises a generally cylindrically shaped rod 17 which may be provided with external threads 18 for receipt of a nut 20, or the like. The rod 17 is provided with a longitudinal, centrally located aperture 24 for purposes which are fully described hereinafter. The leading edge 26 of the rod 17, as viewed in the direction of introduction of the anchoring member 16 into the hole 12 of the support structure 10, may be flat or convex in shape and may include at least one notch 25 (FIG. 3) running transversely along the diameter thereof. The trailing edge 27 of the anchoring member 16, when viewed in the direction of introduction of the anchoring member 16 into the hole 12, is fitted with a valve means 22 communicating with the aperture 24. The valve means 22 is preferably a one-way valve, or zerk, adapted at the upper end for fitting engagement with an injection device (not shown). The injection device may be, for example, a pump and equipment associated therewith for delivering a pressurized stream of hardenable and cementitious material to the valve means 22. In this regard, the term "hardenable and cementitious material" means any material, initially in a flowable state which upon exposure to air may, over time, harden. Representative examples of such hardenable and cementitious material include, without limitation, Portland cement, epoxy resin, such as that manufactured and sold by Fox Industries under the name FX-60 HYDRO-ESTER-LOW MODULUS LV and that manufactured and sold by Rocky Mountain Chemical Co. under the name NIKLEPOXY, and polymeric polysulfide based resin and organic amine based resin (either a separate or combined resin system), such as the polysulfide/amine based resin manufactured and sold by Sika Chemical Corp. under the name COLMA FIX LV. When epoxy resin is used as the hardenable and cementitious material, it is preferred the epoxy be about a 100% solids, water-insensitive two-component resin system.

As will be appreciated, when the hardenable and cementitious material is forced, under pressure, into the valve means 22, the one-way valve included therein will be activated such that the hardenable and cementitious material flows through the valve means 22 and into and through the aperture 24 but backflow is substantially prohibited.

The rod 17 of the anchoring member 16 is provided on the exterior surface and adjacent the leading edge 26 thereof with a spiral groove 28. The groove 28 is adapted for receipt of a length of wire such as, for example, the wire 30 depicted in FIG. 4. Although the wire 30 of FIG. 4 is shown in a pre-formed spiral or helical shape, it should be appreciated that the wire 30 need not be pre-formed into such a shape. The wire 30 may, of course, be a malleable wire of sufficient flexibility, such as, for example number 9 gauge mild steel wire, to permit the ready placement of the wire 30 in the groove 28 prior to insertion of the anchoring member 16 in the hole 12.

In the apparatus of the present invention, it is preferred that the wire 30 be of a diameter such that it may be seated in the groove 28 yet not be flush with the external surface of the rod 17. That is, when positioned within the groove 28, the wire 30 will form slightly raised threads adjacent the leading edge 26 of the rod 17 as depicted in FIG. 1.

As shown in FIG. 3, and more particularly depicted in FIG. 4, the wire 30 is formed with a lip 31 projecting outwardly from the lower end thereof. When the wire 30 is positioned in the groove 28 of the anchoring member 16, the lip 31 will extend beyond the diameter of the anchoring member 16 adjacent the leading edge 26. Thus, when the anchoring member 16 is placed in the hole 12 and turned in a direction counter to that of the direction of the groove 28, the wire 30 will tend to travel "up" the shaft of the anchoring member 16 until the lip 31 contacts and becomes firmly embedded against the inner-surface of the hole 12. Accordingly, the lip 31 acts as a means for temporarily positioning and locking the anchoring member within the hole 12 until the hardenable and cementitious material, which is subsequently injected, has set.

Although not forming a specific part of the apparatus of the present invention, it should be noted that the anchoring member 16 may be provided with a plate 32 which may be slideably mounted on the rod 17. The plate 32 may be a metal plate and may also be a concrete plate, block, or the like. A more detailed discussion of the plate 32 immediately follows in respect of the method of the present invention.

The apparatus of the present invention having been described in detail, it is now only necessary to describe the method of the present invention.

In order to secure the anchoring member 16 of the present invention in the support structure 10, it is necessary to initially form the hole 12 in the support structure 10. The hole 12 may be formed by drilling into a solid portion of the support structure 10 or may be pre-formed by forming the support structure 10 around a die positioned therewithin. In either event, once the hole 12 is suitably constructed, it should preferably be internally cleaned and may be dried if desired, i.e., if a water-insensitive hardenable and cementitious material is not to be used. In readying the apparatus for use, the wire 30 is positioned in the groove 28 of the rod 17 and the anchoring member 16 is inserted into the hole 12. The anchoring member 16 is then "screwed" into the hole 12 until the lip 31 on the wire 30 contacts and holds firmly against the inner-surface of the hole 12. In the event it is desired to utilize the plate 32 as an additional bearing device for weight distribution, the plate 32 may be inserted over the trailing edge 27 of the rod 17. Thereafter, the nut 20 may be threadedly engaged on the threads 18 of the rod 17 and threaded onto the rod 17 until the nut 20 contacts the plate 32, or in its absence the upper surface of the support structure 10. The nut 20 is tightened, as by hand tightening, onto the rod 17 in order to assure that the rod 17 does not turn during subsequent operations.

In order to inject the hardenable and cementitious material into the clearance 14, the injection device (not shown) is attached to the valve means 22 and pressurized injection commences. As will be appreciated, during pressurized injection, the hardenable and cementitious material flows through the valve means 22, the aperture 24, and exits the aperture 24 at the leading edge 26 of the rod 17. In the event that the end portion of the rod 17 (adjacent the leading edge 26) contacts the bottom of the hole 12 in the support structure, the groove 25 facilitates flow of the hardenable and cementitious material into the clearance 14. Continued pressurized injection of the hardenable and cementitious material forces that material into the clearance 14 where it contacts the wire 30 in the groove 28. Due to the spiral construction of the wire 30, as positioned within the groove 28, the hardenable and cementitious material is advantageously assisted in its upward flow from the bottom of the hole 12 to the top portion thereof. The pressurized injection continues until the hardenable and cementitious material fills the clearance 14 of the hole 12 and flows out of the top portion thereof. The apparatus is then allowed to remain in an undisturbed state until such time as the hardenable and cementitious material hardens and sets. Thus, upon hardening and setting, the anchoring member 16 is firmly embedded within the support structure 10. The nut 20 may be removed from the rod 17 and any structure desired to be attached to the support structure 10 via the anchoring member 16 may be placed thereon. It is thus only necessary to reposition the nut 20 on the rod 17 and to tighten the nut 20 in order to hold the desired object firmly in place.

While the invention has been illustrated and described as embodied in a method and apparatus for securing objects to support structures, it is not intended to be limited to the details shown, since various modifications and structural changes may be made without departing in any way from the spirit of the present invention. Further, it will be understood that each of the elements described above, or two or more together, may also find a useful application in other types of construction differing from the type described above.

Without further analysis, the foregoing will so fully reveal the gist of the present invention that others can, by applying current knowledge, readily adapt it for various application without omitting features that, from the standpoint of the prior art, fairly constitute essential characteristics of the generic or specific aspects of this invention.

I claim:

1. An apparatus for securing an object to a support structure having an anchoring hole, comprising a rod-shaped anchoring member provided with an aperture longitudinally therethrough, said anchoring member being externally threaded at a first end thereof and having at the second end thereof a spiral groove, one end of which is positioned adjacent said second end and the other end of which terminates at a point less than or equal to the midpoint of said anchoring member when measured from said second end of said member to said first end thereof, with said spiral groove having a flexible wire member disposed therewithin, said wire member including an outwardly projecting lip at the end thereof located adjacent said second end of said anchoring member, said anchoring member having at the first end thereof a one-way valve for communication from said first end to said second end, with said second end being provided with a groove disposed perpendicular to the longitudinal axis of said aperture and in communication with said aperture.

2. The apparatus of claim 1, further including a nut threadedly engagable with said external threads.

3. The apparatus of claim 1, wherein said flexible wire member is a pre-formed wire member adapted for receipt in said groove, said wire member including an outwardly projecting lip at one end thereof.

4. A method for securing an object to a structure provided with an anchoring hole, comprising the steps of:
   a. inserting into said anchoring hole a rod-shaped anchoring member provided with an aperture longitudinally therethrough, said anchoring member being externally threaded at a first end thereof and having at the second end thereof a spiral groove, one end of which is positioned adjacent said second end and the other end of which terminates at a point less than or equal to the midpoint of said anchoring member when measured from said second end of said member to said first end thereof, with said spiral groove having a flexible wire member disposed therewithin, said wire member including an outwardly projecting lip at the end thereof located adjacent said second end of said anchoring member, said anchoring member having at the first end thereof a one-way valve for communication from said first end to said second end, with said second end being provided with a groove disposed perpendicular to the longitudinal axis of said aperture and in communication with said aperture;
   b. injecting under pressure a hardenable and cementitious material through said one-way valve until said anchoring hole is substantially filled with hardenable and cementitious material; and
   c. permitting said hardenable and cementitious material to harden and set.

5. The method of claim 4, wherein said hardenable and cementitious material comprises Portland cement.

6. The method of claim 4, wherein said hardenable and cementitious material comprises epoxy resin.

7. The method of claim 4, wherein said hardenable and cementitious material comprises polymeric polysulfide based resin.

8. The method of claim 4, wherein said hardenable and cementitious material comprises organic amine based resin.

* * * * *